(12) United States Patent
Praskovskaya et al.

(10) Patent No.: US 8,899,660 B1
(45) Date of Patent: Dec. 2, 2014

(54) AERODYNAMIC SKIRTS FOR LAND VEHICLES

(71) Applicants: Eleanor Praskovskaya, Lauderdale By The Sea, FL (US); Andrew Praskovsky, Lauderdale By The Sea, FL (US); Alexander Praskovsky, Lauderdale By The Sea, FL (US)

(72) Inventors: Eleanor Praskovskaya, Lauderdale By The Sea, FL (US); Andrew Praskovsky, Lauderdale By The Sea, FL (US); Alexander Praskovsky, Lauderdale By The Sea, FL (US)

(*) Notice: Subject to any disclaimer, the term of this patent is extended or adjusted under 35 U.S.C. 154(b) by 0 days.

(21) Appl. No.: 14/181,694

(22) Filed: Feb. 16, 2014

Related U.S. Application Data

(60) Provisional application No. 61/766,210, filed on Feb. 19, 2013.

(51) Int. Cl.
  *B62D 37/02* (2006.01)
  *B62D 35/00* (2006.01)

(52) U.S. Cl.
  CPC .................................. *B62D 35/001* (2013.01)
  USPC ..................................... 296/180.4; 296/180.1

(58) Field of Classification Search
  CPC ....... B62D 35/00; B62D 35/001; B62D 35/02
  USPC ........................................... 296/180.1, 180.4
  See application file for complete search history.

(56) References Cited

U.S. PATENT DOCUMENTS

| | | | | |
|---|---|---|---|---|
| 5,280,990 | A * | 1/1994 | Rinard ........................ | 296/180.1 |
| 5,598,990 | A * | 2/1997 | Farokhi et al. ............. | 244/200.1 |
| 7,404,592 | B2 * | 7/2008 | Reiman et al. ............. | 296/180.4 |
| 7,578,541 | B2 * | 8/2009 | Layfield et al. ............ | 296/180.2 |
| 7,604,284 | B2 * | 10/2009 | Reiman et al. ............. | 296/180.4 |
| 7,740,303 | B2 * | 6/2010 | Wood ......................... | 296/180.4 |
| 7,780,224 | B2 * | 8/2010 | Roush ........................ | 296/180.4 |
| 7,828,368 | B2 * | 11/2010 | Ortega et al. .............. | 296/181.5 |
| 7,942,471 | B2 * | 5/2011 | Boivin et al. .............. | 296/180.4 |
| 8,177,286 | B2 * | 5/2012 | Brown et al. .............. | 296/180.4 |
| 8,191,956 | B1 * | 6/2012 | Dixon et al. ............... | 296/180.4 |
| 8,276,972 | B2 * | 10/2012 | Domo et al. ............... | 296/180.1 |
| 8,303,025 | B2 * | 11/2012 | Senatro ...................... | 296/180.4 |
| 8,336,950 | B2 * | 12/2012 | Andrus et al. ............. | 296/180.1 |
| 8,366,180 | B2 * | 2/2013 | Lee et al. ................... | 296/180.4 |
| 8,398,150 | B2 * | 3/2013 | Brown et al. .............. | 296/180.4 |
| 8,403,400 | B2 * | 3/2013 | Brewer ...................... | 296/180.1 |
| 8,616,616 | B2 * | 12/2013 | van Raemdonck ........ | 296/180.4 |
| 8,678,473 | B2 * | 3/2014 | Dayton ...................... | 296/180.4 |
| 8,727,425 | B1 * | 5/2014 | Senatro ...................... | 296/180.4 |
| 2007/0120397 | A1 * | 5/2007 | Layfield et al. ............ | 296/180.4 |
| 2011/0068605 | A1 * | 3/2011 | Domo et al. ............... | 296/180.4 |
| 2012/0319428 | A1 * | 12/2012 | Wood ......................... | 296/180.4 |
| 2013/0076066 | A1 * | 3/2013 | Wong et al. ................ | 296/180.4 |
| 2014/0035318 | A1 * | 2/2014 | Brown et al. .............. | 296/180.4 |
| 2014/0145467 | A1 * | 5/2014 | Ellis ........................... | 296/180.4 |

* cited by examiner

*Primary Examiner* — Lori L Lyjak

(57) ABSTRACT

The invention provides an aerodynamic system and a method for controlling airflow over a land vehicle by self-adaptive aerodynamic means alternatively to essentially impenetrable obstructions. The system comprises at least one aerodynamic skirt disposed under the vehicle body. Each aerodynamic skirt is an assembly of airflow-controlling elements forming a surface of the skirt. The elements obstruct only a part of the surface area and create openings over the remaining part of the area. The airflow-controlling elements are configured to reduce the vehicle air drag and mitigate detrimental impacts of side winds on the vehicle by generating optimum air streams over the openings and away from the openings, creating backward air streams under the body and generating aerodynamic vortex shields.

20 Claims, 9 Drawing Sheets

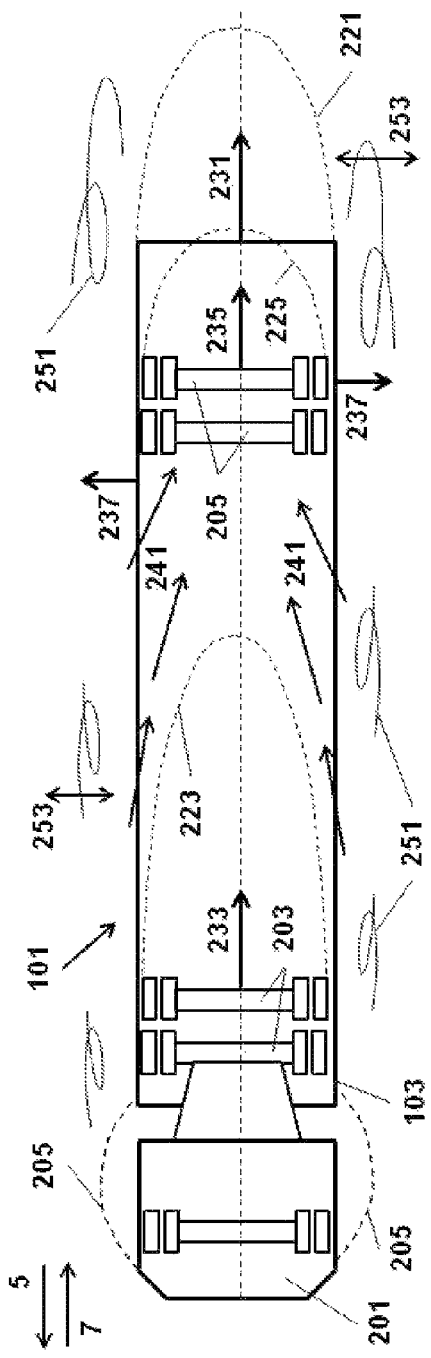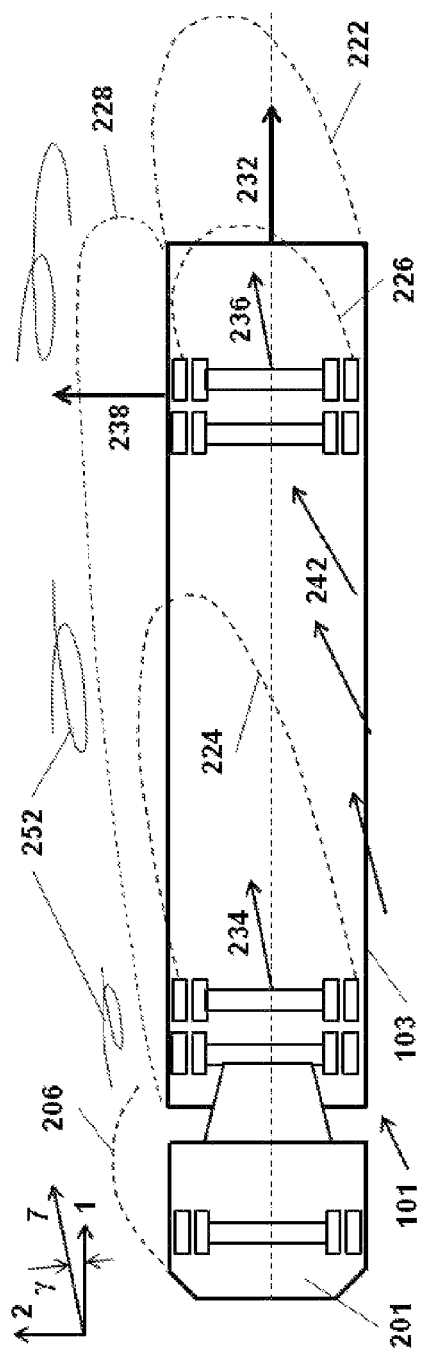
FIG. 2a
FIG. 2b

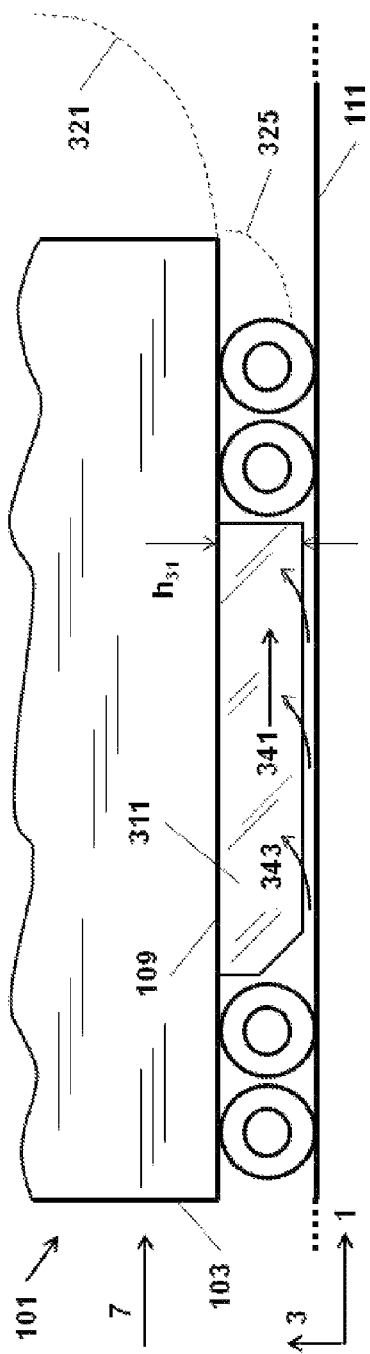
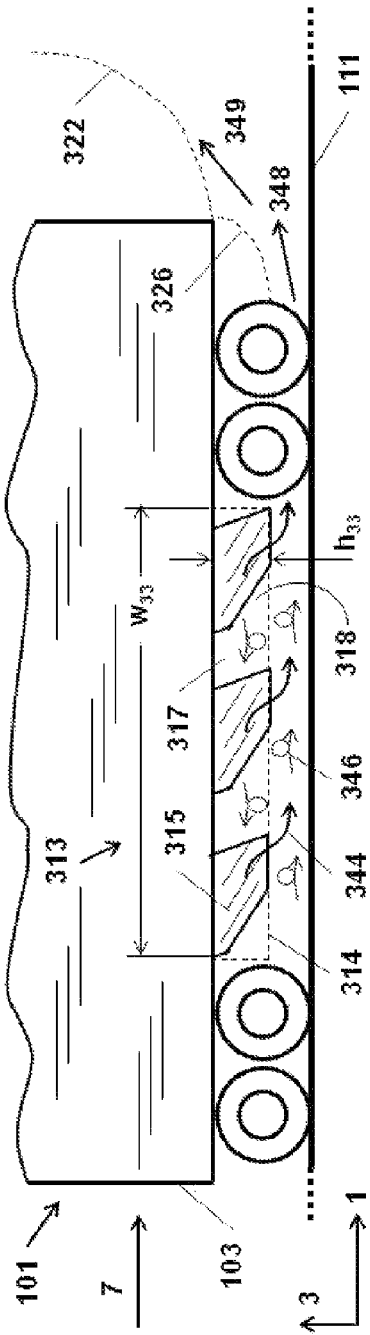
FIG. 3a
FIG. 3b

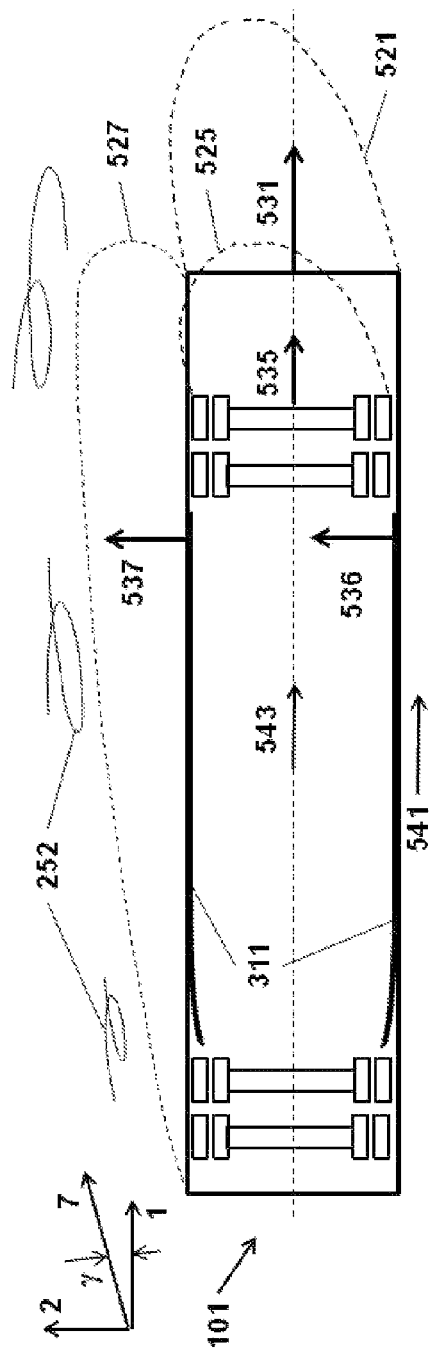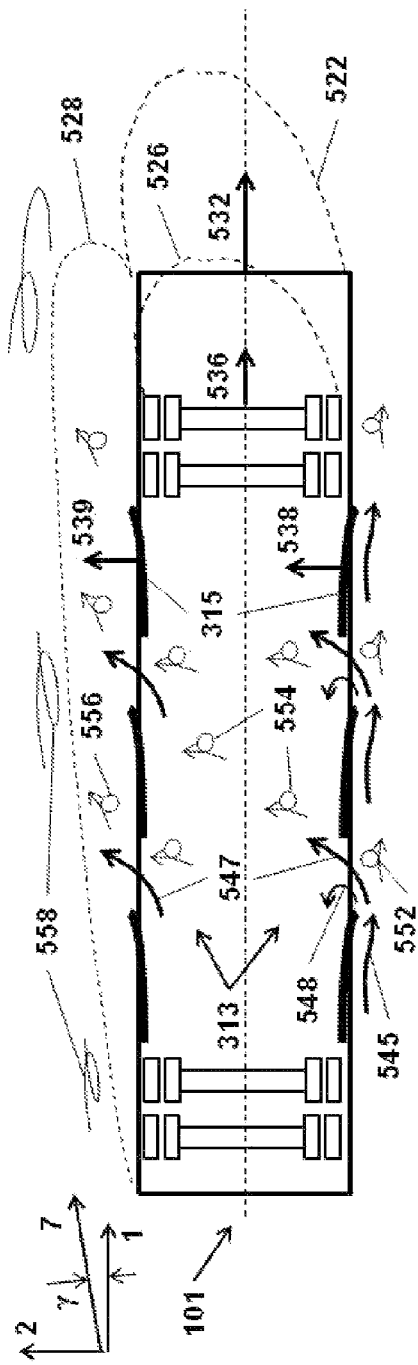

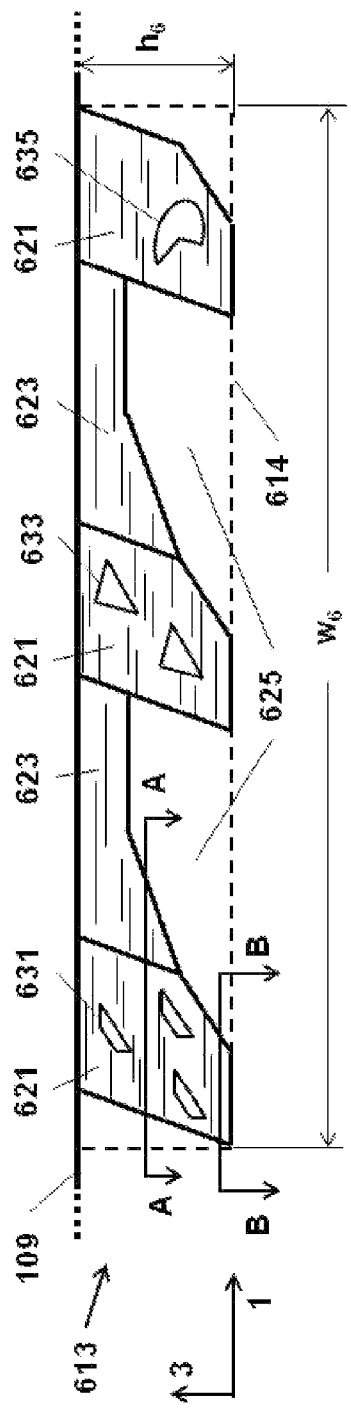
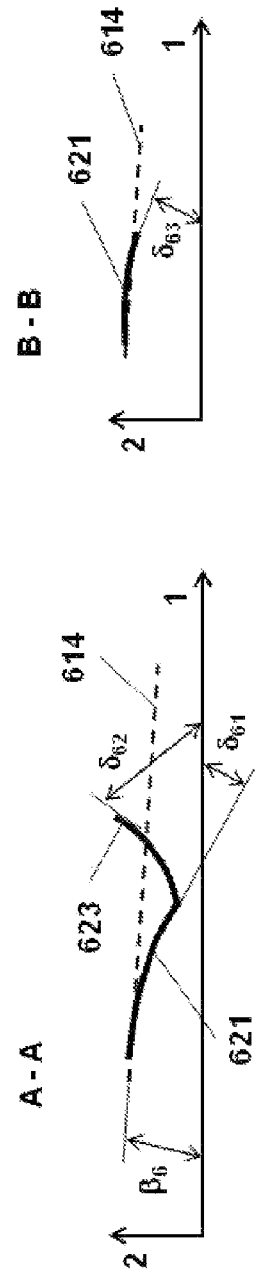
FIG. 6a
FIG. 6b

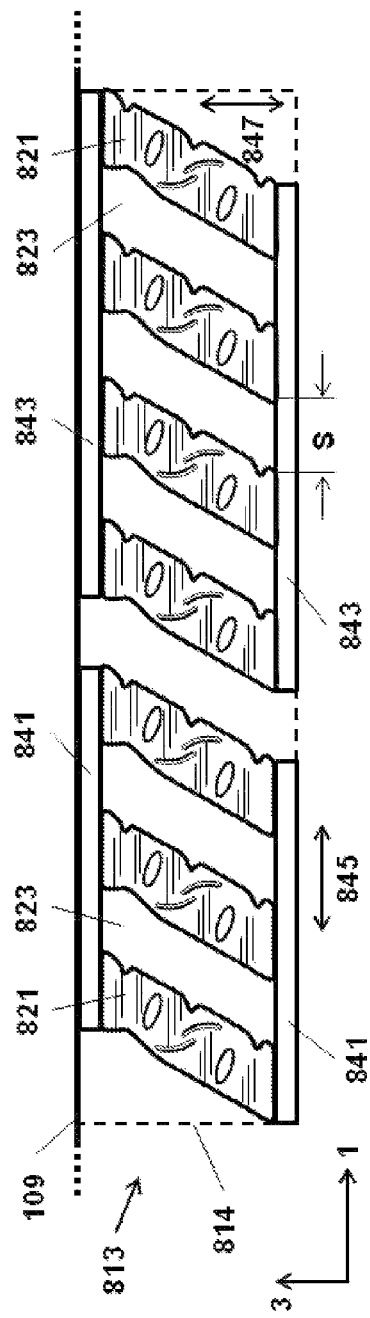
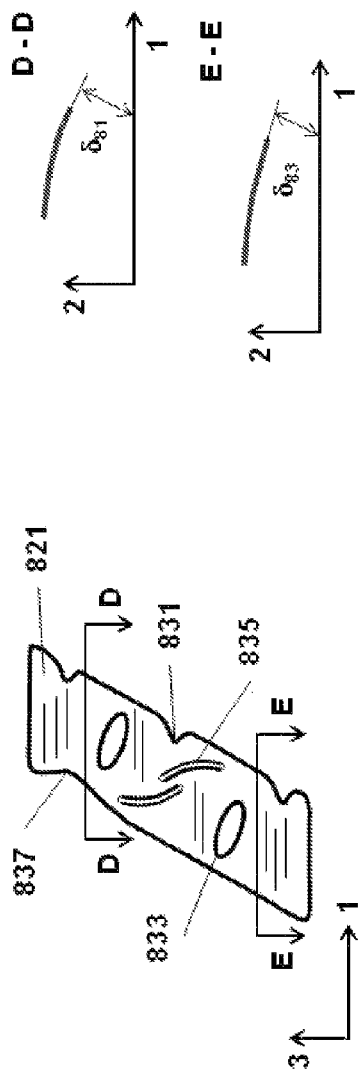
FIG. 8a
FIG. 8b
FIG. 8c

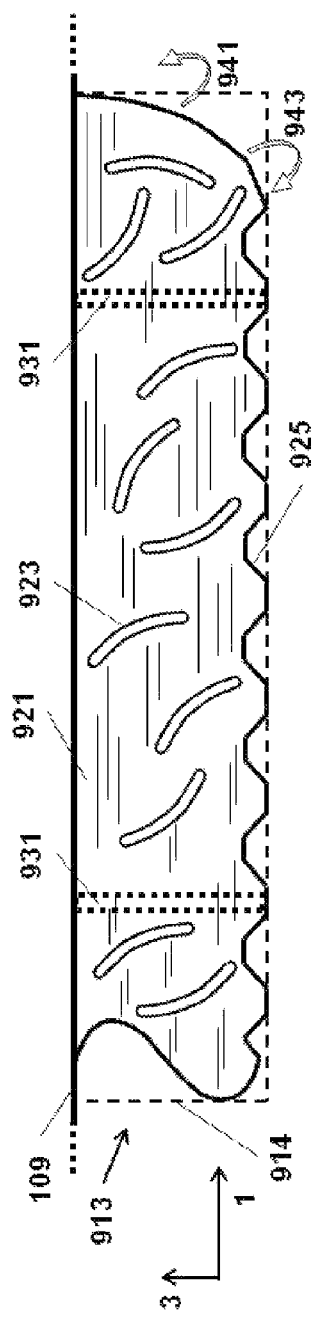
FIG. 9a
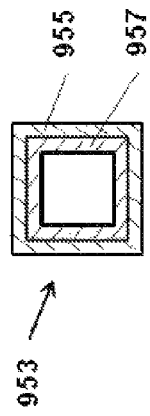
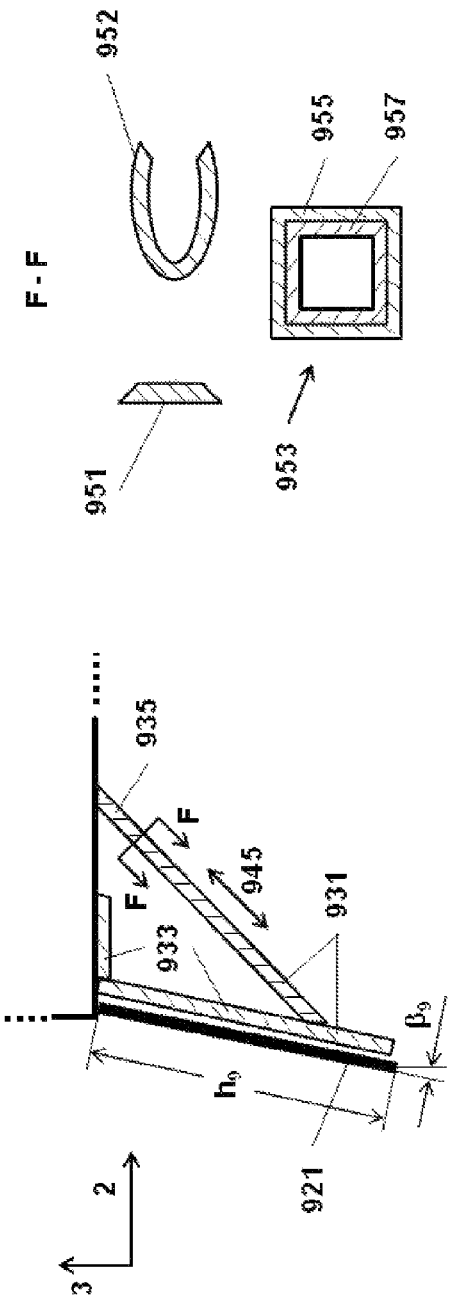
FIG. 9b
FIG. 9c

AERODYNAMIC SKIRTS FOR LAND VEHICLES

CROSS-REFERENCE TO RELATED APPLICATION

This application claims the benefit under 35 U.S.C. §119(e) of provisional patent application No. 61/766,210 filed Feb. 19, 2013; the provisional patent application is herewith incorporated by reference.

BACKGROUND OF THE INVENTION

1. Field of the Invention

The invention relates to systems for reducing aerodynamic drag and mitigating detrimental impacts of side wind for land vehicles and, specifically, to aerodynamic skirts for controlling airflow under a vehicle body by self-adaptive aerodynamic means.

2. Description of the Related Art

In the contents of the present invention, a land vehicle is defined as any means for transporting people and/or cargo on the ground. The below description is focused on a specific application of the present invention to cargo vehicles which is done for simplifying explanation of the distinctive physical effects and features of the invention. Any person skilled in the art can apply the described invention to other vehicles.

A standard cargo vehicle consists of a tractor and one or several cargo holding areas (containers) of any kind that are attached to a tractor or towed, referred below as trailers. A vehicle has a body which is disposed above wheel assemblies. As such vehicle moves along its path, the airflow around the vehicle produces aerodynamic drag and increases the fuel consumption. The surrounding airflow may also produce side forces and yawing and rolling moments acting on the vehicle and decreasing its aerodynamic stability and driving safety.

An aerodynamic drag, or air drag, is the aerodynamic resistance force acting on a vehicle and opposing its motion through a surrounding air. It is well-known that about 30% of a vehicle air drag is produced under the vehicle body. Numerous devices typically referred to as skirts have been developed for reducing an aerodynamic drag in the drag-producing volume under the vehicle body at no wind or head/tail wind. However, no special attention was paid to reducing detrimental impacts of a side wind which increases aerodynamic drag at stable or gusty side winds, vehicle jack-knifing and trailer swing, and forces a vehicle out of a traffic lane and may overturn a vehicle by strong gusts. Hereafter a side wind is defined as airflow around a vehicle at non-zero yaw angle.

A diverse body of tractor and trailer skirts has been developed for reducing air drag in the drag-producing volume under bodies of land vehicles and numerous patents for such devices have been awarded around the world. The skirts are typically positioned under a tractor body and/or a trailer body on the driver and passenger sides and configured to form essentially impenetrable walls separating the under-body volume from an external airflow in a lateral direction. Typical embodiments of skirts can be found, for example in the U.S. Pat. No. 7,093,889 to Graham, the U.S. Pat. No. 7,578,541 to Layfield et al., the U.S. Pat. No. 7,740,303 to Wood, the U.S. Pat. No. 7,748,772 to Boivin et al., the U.S. Pat. No. 8,303,025 to Senatro, the U.S. Pat. No. 8,579,359 to Brown et al. and references in those patents. Typical designs of skirts for a tractor cab and trailer can be found, for example in the U.S. Pat. No. D499,679 to Perfetti et al., the U.S. Pat. No. D578,944 to Dolan et al., the U.S. Pat. No. D649,090 to Boivin et al. and references in those patents.

Typical skirts have a height that provides low ground clearance for a vehicle and the skirts are often damaged on uneven roads. To mitigate this problem, flexible and deformable skirts have been developed and typical embodiments can be found, for example in the U.S. Pat. No. 7,686,385 to Dolan et al., the U.S. Patent Application. No. 2011/0233960 to Heinz, the U.S. Pat. No. 8,449,017 to Boivin et al. and references in those patents.

Typical skirts fit only trailers of a height and a separation between tires within limited ranges and adjustable configurations of the skirts have been developed to fit a wide variety of vehicles. Adjustable skirts are often made from separate parts like slats, panels and the like where those parts are joined together for adjusting the skirt length. Although some adjustable skirts consist of separate parts, their assembled operational configuration has an essentially impenetrable surface. Typical embodiments of adjustable skirts can be found, for example in the U.S. Pat. No. 5,921,617 to Loewen et al., the U.S. Pat. No. 6,644,720 to Long et al., the U.S. Pat. No. 7,942,466 to Reiman et al., the U.S. Pat. No. 8,210,599 to Butler, the U.S. Pat. No. 8,398,150 to Brown et al. and references in those patents.

Typical trailer skirts on vehicle sides affect airflow over a significant part of a drag-producing volume under a vehicle body to reduce air drag on several under-body structures such as wheel assemblies, fuel tanks and the like. Some devices were also proposed for reducing air drag on specific structures under the body. For example, underbody fairings for reducing air drag on wheel assemblies are described in the U.S. Pat. No. 7,828,368 to Ortega et al., the U.S. Pat. No. 8,376,450 to Long et al. and references therein.

The existing tractor and trailer skirts have several drawbacks that may discourage their practical implementation. For example, the skirts typically extend almost to the ground and provide a low ground clearance thus interfering with driving on uneven roads. Low-clearance skirts may be damaged or broken thus requiring a substantial maintenance like periodic repairs. Solid skirts without essential gaps are of a heavy weight and also accumulate much dirt, ice and/or snow which degrades their aerodynamic performance and further increases the weight. The majority of existing skirts has predetermined dimensions varying within limited ranges and do not fit all types of vehicles. Typical existing skirts may be insufficiently effective in reducing air drag at side winds. In particular, essentially impenetrable surfaces of the skirts prevent an ambient air from travelling under a vehicle at side winds which may increase side forces and yawing and rolling moments acting on a vehicle and degrade the vehicle's aerodynamic stability. In addition, existing skirts may be insufficiently effective in reducing air drag on a trailer back.

A need therefore exists for an innovative system that overcomes those shortcomings.

BRIEF SUMMARY OF THE INVENTION

It is an object of the invention to provide a system that overcomes the disadvantages of the heretofore-known devices and methods and provides for the efficient reduction in aerodynamic drag and detrimental side forces and moments for land vehicles.

A system of the present invention consists of one or several aerodynamic skirts disposed under the vehicle body. Each aerodynamic skirt is an assembly of airflow-controlling elements forming a surface of the skirt. The elements physically obstruct only a part of the skirt surface area and create unobstructed openings over the remaining part of the area.

The major distinctive feature of aerodynamic skirts of the present invention from the prior art is in controlling airflow by self-adaptive aerodynamic means instead of using essentially impenetrable surfaces. The airflow-controlling elements of the present invention are configured and positioned to create optimum air streams over and away from the openings and backwards air streams under the vehicle body; the elements may also generate small-scale vortices. The air streams and vortices form aerodynamic barriers which control airflow over a larger area than the area of the skirt. The barriers reduce air drag and fuel consumption of the vehicle by controlling an injection of ambient air under the vehicle body, creating the backward airflow with negative air drag under the body and destroying harmful large-scale turbulent vortices in accordance with varying wind speed and direction. When side winds are present, the air streams and vortex shields also reduce significantly side forces and moments by re-directing adaptively air streams under the vehicle body towards a low-pressure zone on the vehicle leeside and destroying harmful large-scale turbulent vortices to decrease a size of the low-pressure zone and the pressure drop on the leeside wall. Aerodynamic control of airflow under the vehicle body by self-adaptive aerodynamic barriers is more efficient than conventional control by non-adaptive impenetrable obstructions.

The airflow-controlling elements in the skirts of the present invention cover preferably from 20% to 85% of the skirt area or, respectively, the openings occupy preferably from 15% to 80% of the area. This feature ensures a low weight and an adjustable length of the skirts and easy access to under-body accessories. A height of the elements may be significantly smaller than that of typical existing skirts to ensure large ground clearance of the vehicle and high durability of the aerodynamic skirts. An open area in the surfaces of the skirts of the present invention ensures superior performance at side winds.

Innovative aerodynamic skirts of the present invention utilize a new method for developing high-performance skirts consisting of airflow-controlling elements which obstruct only a part of the skirt surface area and create an open area. The distinctive feature of the method is to control airflow by self-adaptive aerodynamic means rather than by impenetrable material obstructions. The feature is utilized by configuring and positioning airflow-controlling elements in an arrangement which takes the most benefits from combining efficient aerodynamic means such as air-bending air streams, wave-breaking air streams and/or vortex shields. The optimally formed air streams and the vortices collide with surrounding air and create self-adaptive aerodynamic barriers which control airflow over a larger area than the area of the skirt according to the changes in ambient conditions such as temperature, wind speed and direction.

The above Summary is provided to introduce a selection of concepts in a simplified form that are further described in the Detailed Description of the Invention. The Summary is not intended to be used for determining the scope of the claimed subject matter.

BRIEF DESCRIPTION OF THE SEVERAL VIEWS OF THE DRAWINGS

Specific features and advantages of the present invention will become better understood by those skilled in the art after considering the following detailed description in conjunction with the accompanying drawings, wherein:

FIGS. 2a and 2b show schematically a view upward from the ground on airflow around a typical heavy cargo vehicle without skirts at no side wind and in the presence of a side wind;

FIGS. 3a and 3b show schematically a side view on airflow at no side winds over a trailer with typical existing skirts and aerodynamic skirts of the present invention;

FIGS. 5a and 5b show schematically a view upward from the ground on airflow in the presence of a side wind over a trailer with typical existing skirts and the aerodynamic skirts of the present invention;

FIGS. 6a and 6b show a general view of another configuration for an aerodynamic skirt according to the present invention and two exemplary horizontal sections through the skirt;

FIGS. 8a, 8b and 8c show a general view of one other configuration for an aerodynamic skirt, an enlarged view of an airflow-controlling element and exemplary horizontal sections through the element according to the present invention;

FIGS. 9a, 9b and 9c show yet another configuration for an aerodynamic skirt according to the present invention, a general view for a support for the skirt and exemplary sections through the support according to the present invention.

DETAILED DESCRIPTION OF THE INVENTION

Figure 1:
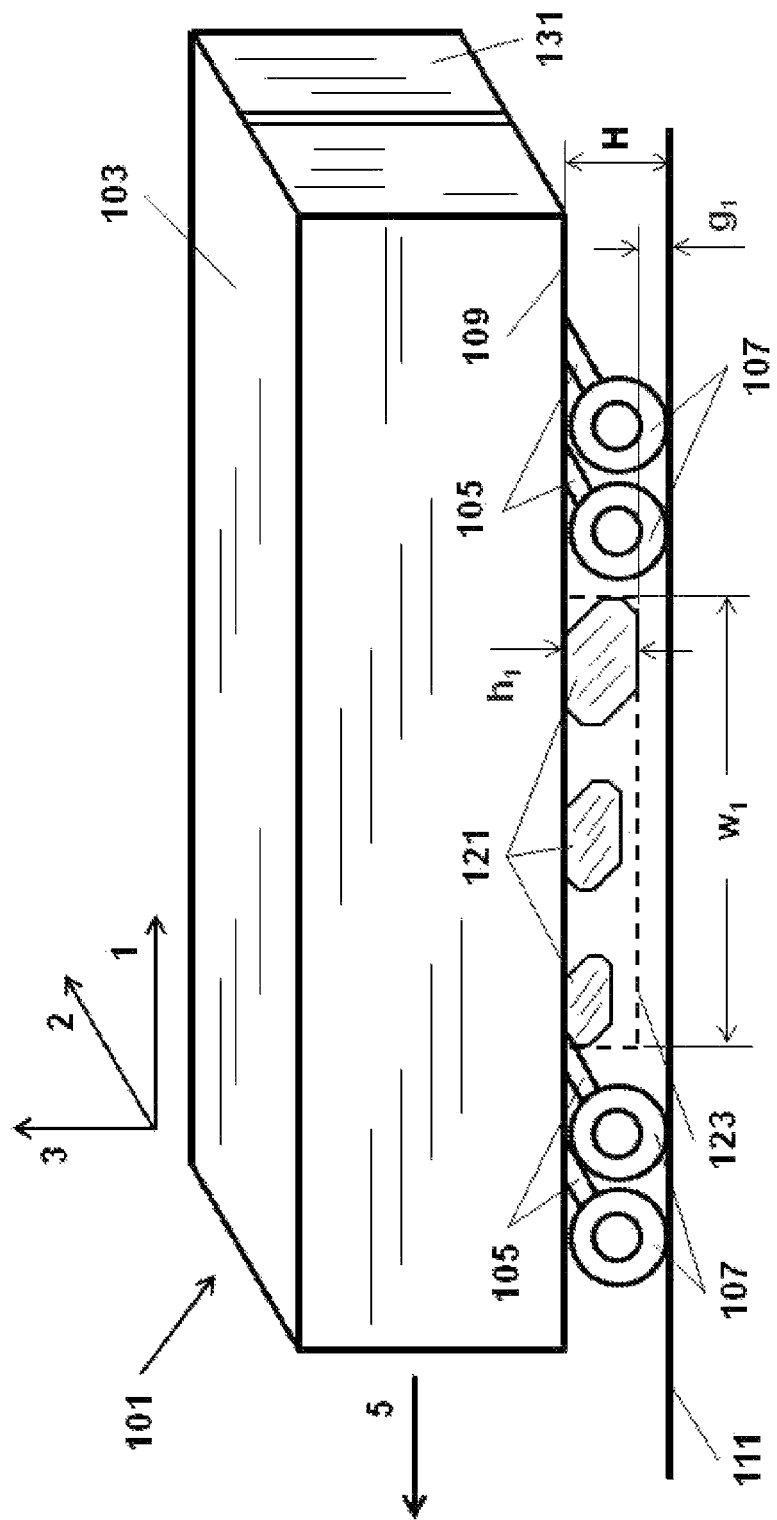
FIG. 1 shows a general view of an exemplary configuration for an aerodynamic skirt according to the present invention and illustrates schematically a terminology used in the disclosure.

Referring now to the drawings in detail, there are seen various illustrations of basic conceptual embodiments of the invention. While specific implementations are described, it should be understood that this is done for illustration purposes only. The described system, aerodynamic skirts and airflow-controlling elements may be modified and a plurality of modifications may be incorporated into the system, the skirts and the elements individually or in any combination without departing from the spirit and scope of the present invention.

FIG. 1 shows a general view of one configuration for an aerodynamic skirt, also referred to as a device, according to the present invention on a typical land vehicle and illustrates schematically a meaning of some terms used in the present disclosure. Certain terminology is used for clarity of explanation only and is not to be taken as a limitation of the present invention. A land vehicle is illustrated in FIG. 1 and the following FIGS. 3-5 as a typical cargo trailer which is done for simplifying a description and the drawings. A trailer 101 has a body 103 disposed above wheel assemblies and it moves on a land surface 111 generally in a horizontal plane in a driving direction which is shown in FIG. 1 and some of the following figures by an arrow 5. Typical wheel assemblies consist of bogies 105 and tires 107 and may also include brakes.

A "horizontal plane" is defined as a plane parallel to the surface 111. A "longitudinal direction" is defined as the direction in the horizontal plane opposite to the driving direction 5 and a "lateral" direction is the direction in the horizontal plane normal to the driving direction; the longitudinal and lateral directions are shown in FIG. 1 and some of the following figures by arrows 1 and 2, respectively. A "vertical direction" is defined as the direction normal to the horizontal plane and is shown in FIG. 1 and some of the following figures by an arrow 3.

FIG. 1 illustrates schematically an exemplary configuration of an aerodynamic skirt according to the present invention. The skirt 121 is positioned underneath and along a lower driver-side edge 109 of the trailer body 103. It is assembled from three spatially separated airflow-controlling elements forming a surface of the skirt with an area illustrated by a dashed rectangular 123. In the present disclosure an area of the skirt is defined as that of a geometrically equivalent rectangular and is equal to the product of a width and a height of the skirt. The width of the skirt is defined as the maximum extent of the assembly in the horizontal plane and the height is defined as the maximum extent of the assembly in a vertical plane. The vertical plane is defined as a plane normal to a direction of the vehicle motion with respect to the land surface 111, or the driving direction 5. In an example in FIG. 1, the vertical plane is parallel to the rear wall 131 of the trailer 101.

The width and the height of the skirt 121 are shown in FIG. 1 as $w_1$ and $h_1$, respectively. As seen in FIG. 1, the skirt 121 obstructs partly the height H of the lower edge 109 of the trailer body 103 above the ground surface 111 and provides a ground clearance of the vehicle illustrated as $g_1 = H - h_1$.

As illustrated in FIG. 1, the areas materially covered, also referred to as shadowed, by three airflow-controlling elements 121 are significantly smaller than the skirt area 123. The area that is physically shadowed by the elements is also referred to as an obstructed area. The remaining skirt area which is not tangibly obstructed by the elements is referred to as open area, an unobstructed area or openings. An exemplary configuration 121 illustrates that aerodynamic skirts of the present invention may have the openings with a respective cumulative area which occupies a considerable part of the skirt area 123.

The distinctive physical features of a new method and aerodynamic skirts according to the present invention are illustrated in FIGS. 2-5.

Physical structure of airflow around a typical cargo vehicle without skirts is illustrated schematically in FIG. 2 showing the views on the airflow upward from the ground. The vehicle consists of a cargo trailer 101 which is towed by a tractor 201.

The airflow at no side wind is illustrated in FIG. 2a. When the vehicle moves through a surrounding air at a given velocity in the driving direction 5, the air moves with respect to the vehicle at the same velocity in the opposite direction illustrated in this and the following FIGS. 3-5 by an arrow 7. The incoming airflow creates low-pressure flow separation zones on the sides of a tractor body illustrated by dashed lines 205 and in the tractor-trailer gap. Low pressure separation zones are also formed behind a bluff-shaped trailer body and behind different structures underneath the tractor and trailer bodies. Separation zones behind the trailer body 103, the rear tractor wheel assembly 203 and the trailer wheel assembly 205 are illustrated by dashed lines 221, 223 and 225, respectively. Differences in a pressure on the front and rear vertical surfaces of a vehicle produce aerodynamic resistance forces acting on the vehicle and opposing its motion through a surrounding air in the driving direction 5, or air drag. The longitudinal drag forces acting on the trailer body, the rear tractor wheel assembly and the trailer wheel assembly are illustrated by arrows 231, 233 and 235. An ambient air travels naturally towards low-pressure zones under the vehicle body as illustrated by arrows 241. The air injected under the body increases the longitudinal air velocity ahead of the under-body structures which in turn increases dynamic pressure on the front vertical surfaces of those structures and the pressure drop on the rear vertical surfaces. The increased differences in pressure increase air drag and fuel consumption of the vehicle. In addition, large-scale turbulent vortices illustrated by symbols 251 are generated on the boundaries of flow separation zones on the tractor sides 205 and in the tractor-trailer gap. A "large-scale" vortex is defined in the disclosure as the vortex which has the largest dimension of the same order of magnitude as the smallest dimension of a drag-producing volume under the vehicle body. The large-scale vortices 251 are unstable in time and space and fluctuate irregularly in the lateral direction as shown by arrows 253. The fluctuating vortices increase an effective size of flow separation zones, the pressure differences on the vertical surfaces and air drag of a vehicle. The large-scale vortices also induce irregularly fluctuating side forces illustrated by arrows 237 and yawing and rolling moments acting on the vehicle. Those fluctuating side forces and moments decrease aerodynamic stability of the vehicle and negatively impact driving safety.

The airflow over the same trailer 101 and tractor 201 in the presence of a side wind is illustrated in FIG. 2b. The incoming airflow 7 has a non-zero yaw angle γ with respect to the longitudinal direction 1 which increases a size of flow separation zones and changes their orientation. The changes of the flow separation zones 221, 223 and 225 in FIG. 2a are illustrated schematically in FIG. 2b by dashed lines 222, 224 and 226, respectively. The airflow at non-zero yaw angle also creates a low-pressure flow separation zone 228 on the leeward side of the trailer. The angled incoming airflow increases significantly injection of the ambient air under the vehicle body on the windward side as illustrated schematically by arrows 242 which in turn increases the longitudinal air velocity, dynamic pressure ahead of the under-body structures and pressure differences on the front and the rear vertical surfaces of the structures. Cumulatively those impacts increase aerodynamic resistance forces acting on the vehicle and also change a direction of some forces as illustrated by arrows 232, 234 and 236. The increased resistance forces directed at non-zero yaw angle increase longitudinal air drag forces and also create stable side forces illustrated by arrow 238 and the yawing and rolling moments acting on a vehicle. The large-scale turbulent vortices 252 on the leeward side of the vehicle are intensified by a side wind which increases an effective size of the leeside separation zone 228 and thus air drag, the side forces and the yawing and rolling moments.

FIGS. 3 and 4 show schematically side views and views upward from the ground on airflows at no side winds over the same trailer 101 as in FIGS. 1 and 2 when the trailer is equipped with typical existing skirts and aerodynamic skirts according to the present invention. In FIGS. 3, 4 and the following FIGS. 5-9 the skirts are positioned underneath and along the lower edges 109 of the trailer body 103 on the driver and passenger sides. This typical configuration is shown for illustration only and is not to be taken as the limitation of the present invention.

Figure 4A:
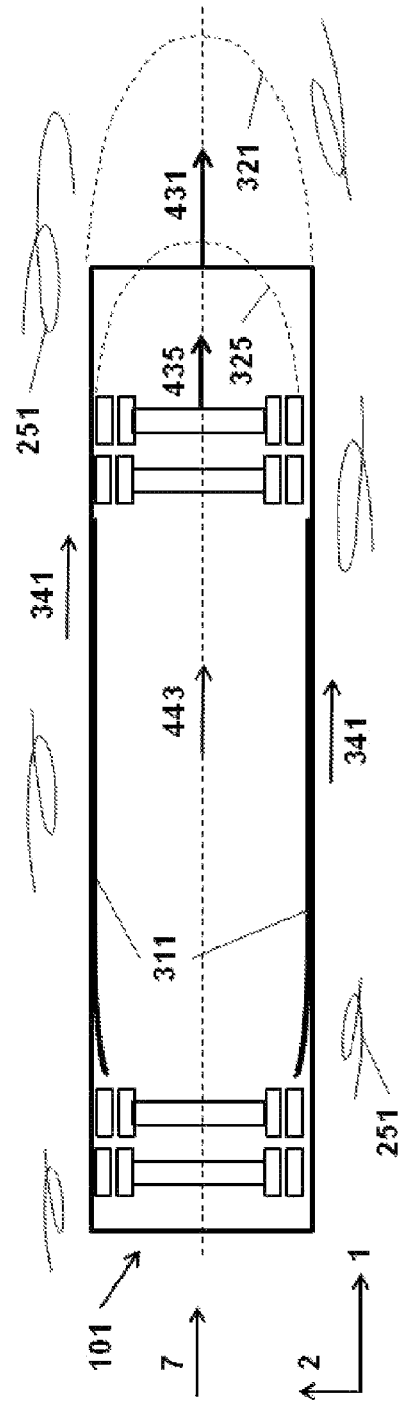
FIGS. 4a and 4b show schematically a view upward from the ground on airflow at no side winds over a trailer with typical existing skirts and aerodynamic skirts of the present invention.

Existing skirts in their operational configuration have an essentially shadowed impenetrable surface with no significant openings, whether the skirt is made of a single piece of a material or assembled from separate parts like slats, panels and the like. As illustrated in FIGS. 3a and 4a, typical existing skirts 311 are in effect material walls between the under-body volume and the surrounding air moving in the direction 7. The walls form tangible, essentially impenetrable barriers streamlining an ambient airflow along outer surfaces of the skirts and blocking air injection under the vehicle body as illustrated in FIGS. 3a and 4a by arrows 341. In addition, impenetrable surfaces of the skirts prevent harmful large-scale turbulent vortices 251 from going under the vehicle body; FIG. 4a. Altogether it decreases the longitudinal air velocity under the body 443 in FIG. 4a, a size of flow-separation zones such as 321 and 325 and a dynamic pressure ahead of the underbody structures. At no side winds those effects reduce efficiently air drag of a vehicle. However, existing skirts may not block substantially air injection under their material surfaces as illustrated by curved arrows 343 in FIG. 3a. Injected under the skirts air may go upward in the direction of the under-body structures and degrade performance of the skirts.

Figure 4B:
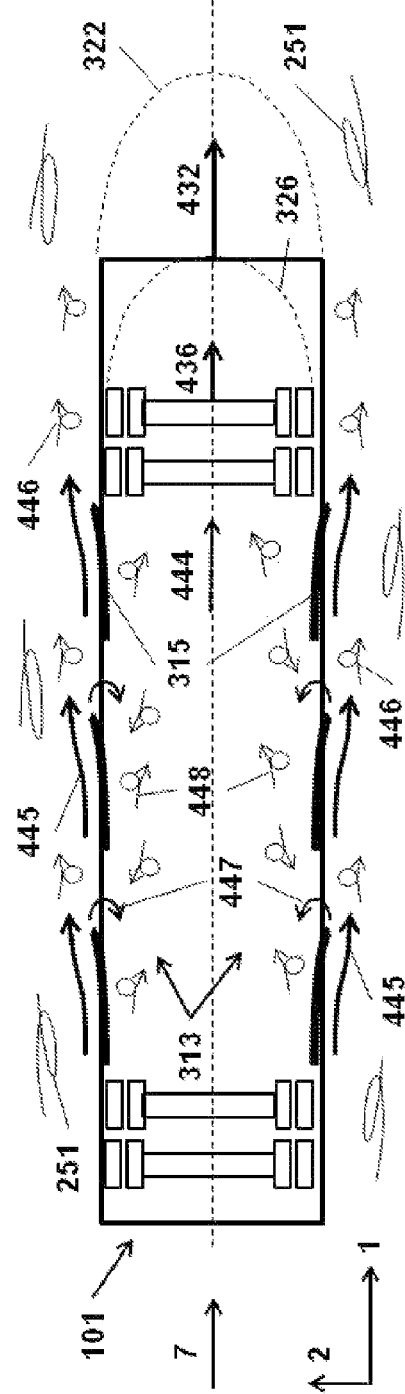

Aerodynamic skirts of the present invention utilize a different, conceptually new method which is illustrated schematically in FIGS. 3b and 4b. Each aerodynamic skirt 313 in this exemplary configuration is an assembly of three airflow-controlling elements 315 spatially separated by gaps 317. The elements form a surface of the skirt with the height $h_{33}$ and the width $w_{33}$; the skirt surface area is shown in FIG. 3b by dashed line 314. It is seen that only a part of the area is obstructed by the elements 315. Spatial gaps 317 between the elements 315, which also include gaps 318 in the element bottoms, create unobstructed openings with a cumulative area which occupies a considerable part of the surface area 314 and ensures a light weight of the skirts 313. As seen in FIG. 3b, the elements 315 have smaller height $h_{33}$ than that of typical existing skirts $h_{31}$ in FIG. 3a which ensures larger ground clearance of a vehicle with the skirts 313. At no side winds, the aerodynamic skirts utilize the same physical effects as the existing skirts: streamline airflow and protect against harmful large-scale turbulent vortices. However those effects are achieved using self-adaptive aerodynamic means instead of material obstructions, more specifically by an aerodynamically efficient shaping and positioning of the elements. As illustrated in FIG. 4b, the airflow-controlling elements 315 are curved in a horizontal plane to form air streams 445 over the openings and re-direct the streams slightly away from the under-body volume as air benders. Re-directed airstreams collide with an ambient airflow and generate small-scale vortices 446 which create an aerodynamical vortex shield. A "small-scale" vortex is defined in the disclosure as the vortex which has the largest dimension at least an order of magnitude smaller that the smallest dimension of a drag-producing volume under the vehicle body. A vortex shield is defined as spatially organized aerodynamic structure formed by a multiplicity of small-scale vortices such as the vortices 446 in FIG. 4b. The air streams 445 and the outer vortex shields 446 in FIG. 4b create aerodynamic barriers along the skirt surfaces which work similar to impenetrable material obstructions. The aerodynamic barrier is defined as an aerodynamic structure formed by spatially organized airstreams and/or vortices and preventing airflow from penetrating through the structure. The barriers streamline an ambient airflow along the outer surfaces of the skirts, prevent air injection under the vehicle body through the openings and block penetration of harmful large-scale turbulent vortices under the body. Those effects decrease the longitudinal air velocity 444 under the body, a size of flow-separation zones such as 322 and 326 and a dynamic pressure on the under-body structures similar to that by conventional impenetrable skirts. Self-adaptive aerodynamic barriers adjust intensities and directions of air streams and small-scale vortices according to parameters of the incoming airflow such as air velocity 7 and temperature. In addition, the outer vortex shields 446 weaken significantly large-scale vortices 251 thus reducing an effective size of a flow separation zone 322 and air drag on the trailer back as well as a spray of dirt and water on the trailer back wall.

Another distinctive feature of the aerodynamic skirts 313 is illustrated in FIG. 4b. The airflow-controlling elements work as self-adaptive wave breakers and may be configured to induce backward air streams illustrated schematically by arrows 447. The backward air streams with an inverse velocity component in a direction opposite to the longitudinal direction 1 produce negative air drag on under-body structures and reduce further air drag of the vehicle. As seen further in FIG. 4b, the elements 315 effectively control airflow by aerodynamic means over much larger width than the skirt width $w_{33}$ obstructed by the elements. The air streams 445 reduce efficiently air injection under the vehicle far downstream of the elements and the streams 447 extend significantly an effective skirt width in the upstream direction. The wave-breaking airflow-controlling elements also modify a weak airflow that still goes under a vehicle body through the openings into un-harmful small-scale vortices illustrated schematically in FIG. 4b by symbols 448. Those small-scale vortices intensify turbulent mixing of air under the vehicle body and reduce pressure differences on the under-body structures. The intensified mixing improves significantly ventilation and cooling of trailer brakes.

One more distinctive feature of the aerodynamic skirts is illustrated in FIG. 3b. The aerodynamically efficient variation in a curvature of the element with height and/or properly shaped openings in the bottom produce self-adaptive air streams 344 directed towards the ground and may also generate small-scale vortices 346 underneath the skirt area 314. The streams 344 and the vortex shield 346 reduce air injection under the vehicle over an area with the larger height than the height $h_{33}$ obstructed by the elements thus increasing an effective area of the skirts towards the ground by aerodynamic means. In addition, the re-directed towards the ground surrounding air injected under the aerodynamic skirts does not go far upward. The majority of the air passes underneath the under-body structures towards the trailer back with no significant negative impact on the air drag as illustrated by arrows 348 and 349. This close to the ground airflow reduces a size of flow separation zones 326 behind the trailer wheel assembly and 322 on the trailer back and air drag of the vehicle.

FIG. 5 shows schematically views upward from the ground on airflows over the same trailer 101 with the same skirts 311 and 313 as in FIG. 4 in the presence of a side wind.

As illustrated in FIG. 5a, typical existing skirts 311 work at side winds in the same way as at no side winds: prevent ambient airflow from passing under a vehicle through their essentially impenetrable surfaces. The windward-side skirt streamlines an ambient airflow along its outer surface as illustrated by an arrow 541 and two skirts together streamline airflow under the vehicle body as illustrated by an arrow 543. The skirts decrease the magnitude of the longitudinal air velocity 543 under the body and a size of flow-separation zones such as 525 behind the trailer wheel assembly which reduces air resistance forces on under-body structures such as the force 535 and the vehicle air drag. However, streamlining airflow at side winds may also produce negative impacts. As seen in FIG. 3a, impenetrable skirts increase a cross-section area of a trailer in the lateral direction which may increase a size of a flow separation zone on the trailer leeside 527 in FIG. 5a and associated air drag. As illustrated in FIG. 5a, the skirts 311 change direction 7 of the incoming airflow to streamlined directions 541 and 543 and the change may produce stable side forces 536 and 537 and yawing and rolling moments acting on the vehicle. Impenetrable skirts 311 do not affect large-scale turbulent vortices 252 on the leeward side of the vehicle which are intensified by a side wind.

As illustrated in FIG. 5b, the windward-side aerodynamic skirt 313 of the present invention streamlines partly an ambient airflow along its outer surface by an aerodynamic barrier formed by air streams 545 and an outside vortex shield 552. At side winds the beneficial wave-breaking effects of aerodynamic skirts 313 with significant openings are pronounced much stronger. The airflow-controlling elements 315 form air streams 547 re-directing a surrounding air which passes under a vehicle through the openings towards the leeside separation zone 528. The airflow-controlling elements 315 may be configured to generate small-scale turbulent vortices under the trailer body and on the trailer leeside illustrated by symbols 554 and 556. The air streams 547 and vortices 556 reduce significantly a size of the leeward separation zone 528 and associated air drag, side forces 538 and 539 and yawing and rolling moments acting on the vehicle. The outgoing small-scale vortices 556 weaken significantly harmful large-scale turbulent vortices 558 and reduce further an effective size and detrimental impacts of the leeside separation zone 528. Small-scale vortices 554 intensify turbulent mixing under the vehicle body which reduces pressure differences on the under-body structures and drag forces on the structures as illustrated by arrow 536. The elements 315 may also be configured to induce backward air streams 548 with negative air drag on the windward-side aerodynamic skirt 313. The elements 315 may be further configured to produce air streams directed towards the ground similar to streams 334 in FIG. 3b for reducing flow separation zone 522 and air drag 532 on the trailer back. Air streams 545, 547 and 548 and turbulent vortices 552, 554 and 556 reduce air drag and side forces and yawing and rolling moments acting on the vehicle. As seen in FIG. 5b, at side winds the skirts 313 effectively control airflow by aerodynamic means far downstream the skirt area physically limited by the elements 315 by creating air streams 545 and 547. Properly configured air benders and wave breakers 315 adjust intensities and directions of air streams and small-scale vortices according to parameters of the incoming airflow.

To summarize, aerodynamic skirts of the present invention streamline an ambient airflow, reduce injection of a surrounding air under the vehicle, reduce the longitudinal air velocities under the vehicle body and prevent penetration of harmful large-scale turbulent vortices under the body. The skirts may also induce backward airstreams with negative air drag and intensify turbulent mixing under the body as well as re-direct ambient air towards the ground. These physical effects are achieved by controlling airflow with efficient self-adaptive aerodynamic means such as air-bending air streams, wave-breaking air streams and/or vortex shields which adjust velocity and direction of the controlled flow in accordance with the changes in ambient conditions such as temperature, wind speed and direction. Self-adaptive aerodynamic means utilized in the aerodynamic skirts of the present invention are more efficient in reducing air drag and side forces and moments acting on the vehicle than conventional non-adaptive obstructions.

As illustrated in FIGS. 3-5, the distinctive physical feature of a new method of the present invention is to control airflow by self-adaptive aerodynamic means rather than by conventional impenetrable obstructions. Aerodynamic means allow developing high-performance skirts consisting of airflow-controlling elements which physically obstruct only a part of the skirt surface area and create a significant open area. The feature is utilized by configuring and positioning airflow-controlling elements in an arrangement which ensures the optimum combination of beneficial aerodynamic means such as air-bending streams, wave-breaking streams and/or vortex shields. Properly re-directed airstreams collide with an ambient airflow and create aerodynamic barriers blocking penetration of an air under the vehicle body similar to material barriers. Properly configured airflow-controlling elements and/or collision of air streams with surrounding airflow may create aerodynamical vortex shields which enhance further efficiency of the aerodynamic barriers. Those aerodynamic means change parameters of controlled airflow according to the changes in ambient conditions such as temperature, wind speed and direction.

Several representative configurations for aerodynamic skirts according to the present invention are illustrated in FIGS. 6-9. The skirts shown in these figures are positioned underneath the driver-side lower edge 109 of a trailer body.

An aerodynamic skirt 613 in FIGS. 6a and 6b is an assembly of five airflow-controlling elements 621 and 623. The elements are efficient air deflectors forming a surface of the skirt with an area of a height $h_6$ and a width $w_6$ illustrated by a dashed rectangular 614. Two similar elements 623 are shaped differently from three similar elements 621 and adjacent elements touch one another. The elements 621 have gaps 631, 633 and 635 of different shapes inside their surfaces. Gaps 631, 633 and 635 and gaps 625 under the elements 621 and 623 form openings with a cumulative area occupying a considerable part of the skirt area 614. The inside gaps 631, 633 and 635 are configured to generate small-scale vortices such as 446 and 448 in FIG. 4b and may have an enforcement ribs to increase a structural strength of the elements 621. Those gaps also reduce significantly own aerodynamic drag of the skirt assembly 613 at side winds by providing air passages through the elements. Two exemplary horizontal sections A-A and B-B through the skirt 613 are illustrated in FIG. 6b where the longitudinal direction 1 coincides with the driver-side trailer edge 109 in FIG. 6a. It is seen that the skirt surface 614 is positioned at an angle $\beta_6$ to the longitudinal direction and slightly away from the edge 109 in the lateral direction 2. Section A-A in FIG. 6b shows that the elements 621 and 623 have significantly different curvatures $\delta_{61}$ and $\delta_{62}$ to generate airstreams and small-scale vortices re-directing surrounding air away from the vehicle and the backward airstreams and the vortices under the vehicle body similar to airstreams and vortices illustrated in FIGS. 4b as 445, 447 and 446, 448. Sections A-A and B-B also show that the curvature of the elements 621 varies with height as $\delta_{61}$ and $\delta_{63}$ to generate airstreams and small-scale vortices re-directing surrounding air towards the ground similar to airstreams and vortices illustrated in FIG. 3b as 344 and 346.

Figure 7A:
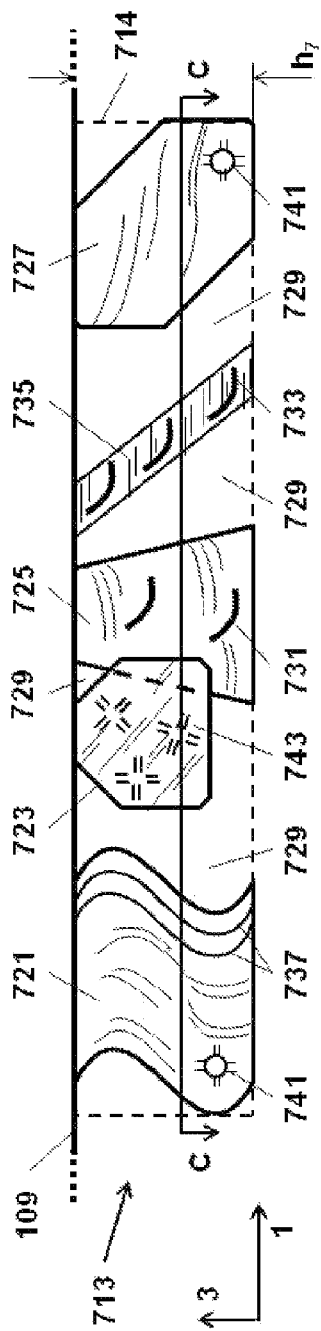
FIGS. 7a and 7b show a general view of one more configuration for an aerodynamic skirt according to the present invention and an exemplary horizontal section through the skirt.
Figure 7B:
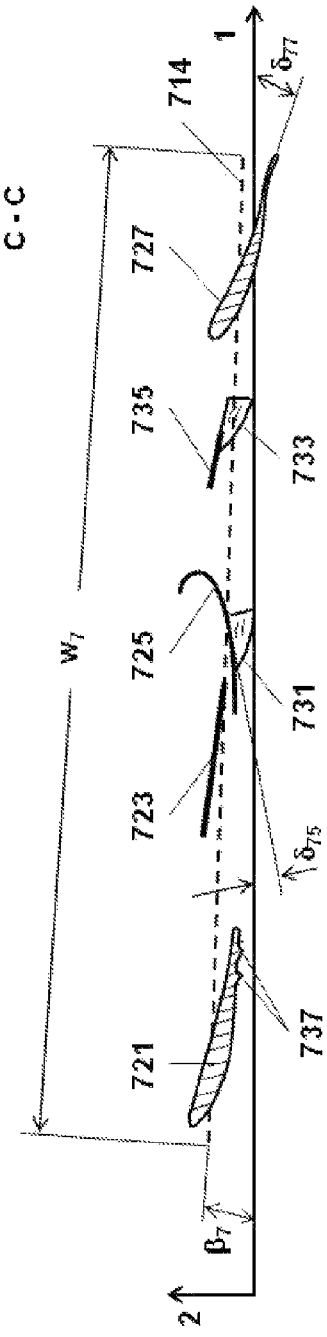

An aerodynamic skirt 713 in FIGS. 7a and 7b is an assembly of four differently configured airflow-controlling elements 721, 723, 725 and 727. The elements form a surface of the skirt with an area of a height $h_7$ and a width $w_7$ illustrated by dashed rectangular 714. The elements are separated by openings 729 with a cumulative area occupying a considerable part of the area 714. The skirt assembly 713 also includes vortex generators 731 attached to the element 725 and vortex generators 733 positioned between the elements 725 and 727 on a holder 735. The generators 731 and 735 are illustrated in an exemplary configuration 713 as conventional curved fins widely used for creating small-scale vortices on aircraft wings and motor vehicles. As seen in the side view in FIG. 7a and an exemplary horizontal section C-C in FIG. 7b, the elements 723 and 725 are a conventional flat panel and a curved panel, respectively. The elements 721 and 727 are a conventional blade and a conventional fin with cross-sections that are profiled similar to typical aircraft wings. The element 721 has vortex generators 737 embedded into its profile for generating small-scale vortices. The longitudinal direction 1 shown in FIG. 7b coincides with the driver-side trailer edge 109 in FIG. 7a. It is seen that the skirt surface 714 is positioned at an angle $\beta_7$ to the longitudinal direction and slightly away from the side edge 109 in the lateral direction 2. It is seen further that the elements 721, 723, 725 and 727 are oriented at significantly different angles with respect to the longitudinal direction as illustrated by angles $\delta_{75}$ and $\delta_{77}$ for elements 725 and 727. The optimum shaping and positioning of the elements as well as adding small-scale vortex generators ensures creation of aerodynamically efficient air streams and vortex shields for re-directing surrounding air away from the vehicle similar to air streams and vortices illustrated in FIG. 4b as 445 and 446. The element 725 is configured specifically to create backward air streams with negative air drag similar to air streams illustrated in FIG. 4b as 447. Adjacent elements 723 and 725 in the skirt assembly 713 are spatially separated but overlap partly one another in a direction normal to the skirt surface. The skirt 713 is also equipped with illuminating means for preventing over-ride collision at a poor visibility. Examples of the means in FIG. 7a include stable or/and flashing lights illustrated by symbols 741 on elements 721 and 727 and fluorescent painting illustrated by symbols 743 on element 723.

An aerodynamic skirt 813 in FIG. 8 is an assembly of similar airflow-controlling elements 821 forming a surface of the skirt with an area illustrated by a dashed rectangular 814. The adjacent elements are separated by distances S and have gaps 833 and 835 inside their surfaces. Separations 823 and gaps 833 and 835 create openings with a cumulative area occupying a considerable part of the area 814. The skirt 813 includes frames 841 and 843 in FIG. 8a separating the assembly into two segments. The frames may also have supports, for example similar to supports 931 in the following FIG. 9a to increase a structural strength of the skirt mounting on the vehicle body and prevent undue vibrations. The frames may be attached immovably to the vehicle body under the lower edge 109 or/and have an adjustable arrangement. As illustrated in FIG. 8a by arrows 845 and 847, a frame 841 may be moved back and forth and a frame 843 may be moved up and down, for example using any standard means such as rails and the like. Any predetermined number of elements 821 may have an adjustable arrangement with respect to the vehicle body or/and the frames. In particular, any of the elements 821 may be movable back-forth along arrow 845 and/or up-down along arrow 847 independently of the frames 841 and 843. Movable frames and/or elements allow the skirt assembly fit different trailers or/and provide access to under-body accessories such as auxiliary fuel tank, spare tire and the like. Detailed view in FIG. 8b shows that the rear edges of the elements 821 are configured to form embedded small-scale vortex generators 831. The elements also have inside gaps 833 and 835 of different shapes. The gaps 833 are configured to generate small-scale vortices such as 448 in FIG. 4b and provide flow passages through surfaces of the elements at side winds. The gaps 835 may be too narrow for providing essential flow passages but still sufficient for compensating differences in a static pressure on external and internal surfaces of the elements 821. The gaps 833 and/or 835 may also have enforcing ribs to increase a structural strength of the elements 821. Altogether, the gaps 833 and 835 and vortex generators 831 reduce significantly own aerodynamic drag of the skirt assembly 813 by providing air passages through the elements, compensating pressure differences and creating small-scale vortices, especially at side winds. Two exemplary horizontal sections D-D and E-E through the element 821 are illustrated in FIG. 8c. The sections show that the curvature of the elements varies with height as illustrated by angles $\delta_{81}$ and $\delta_{82}$ to generate airstreams and small-scale vortices re-directing surrounding air away from the vehicle and towards the ground similar to airstreams and vortices illustrated in FIG. 4b as 445 and 446 and in FIG. 3b as 344 and 346. The elements 821 are also shaped for protecting against damages by different obstacles such as branches of roadside bushes and the like as illustrated in FIG. 8b by a branch protector 837.

The skirt assembly 913 in FIG. 9 consists of one airflow-controlling element 921 forming a surface of the skirt with an area illustrated by a dashed rectangular 914. The element 921 has narrow gaps 923 for compensating differences in a static pressure on external and internal surfaces of the elements to reduce own aerodynamic drag of the skirt 913, especially at side winds. The gaps 923 may also have enforcement ribs to increase a structural strength of the elements 921. Serrated bottom edge 925 reduces own air drag of the assembly 921 and intensifies pressure compensation under the trailer body and on the trailer leeside, especially at side winds. The assembly 913 includes supports 931 to increase a structural strength of the skirt mounting on the vehicle body and prevent vibrations and other detrimental impacts. The supports may also be attached to the frames such as 841 and 843 in FIG. 8a. The supports may provide immovable attachment to the vehicle body of airflow-controlling elements or/and frames and/or an adjustable arrangement for predetermined elements or/and frames. For example, supports 931 may provide a folding of the element 921 inside or/and outside as illustrated in FIG. 9a by curved arrows 941 and 943 to ensure an easy access to under-body accessories. As illustrated by a side view in FIG. 9b, an exemplary support 931 may consist of two components 933 and 935 for enforcing skirt mounting on the vehicle body and preventing its vibrations. Component 935 may have a fixed or a variable length as illustrated by arrow 945. Varying the length of component 935 allows element 921 being folded inside or/and outside as shown by arrows 941 and 943. Supports may have any configuration and cross-sections F-F as illustrated by sections 951, 952 and 953 in FIG. 9c, in particular may be configured to control airflow by generating air streams and/or small-scale vortices. An exemplary section 953 consists of a fixed outside member 955 and inside member 957 which may move along 955 and vary the length of support 935. FIG. 9b shows that the skirt surface 914 may be positioned at an angle $\beta_9$ to the vertical direction 3 and illustrates the height $h_9$ for such configuration.

Aerodynamic skirts of the present invention may be attached to the vehicle with no changes to its construction or be parts of a manufactured vehicle body. The skirts may be manufactured from rigid and/or flexible materials such as plastics, metals and the like. The lightweight materials are preferable although the materials should ensure sufficient structural strength and durability to withstand harsh operational conditions such as abrupt variations in temperature, humidity, extensive exposure to ultraviolet radiation and the like. To satisfy those conditions, different airflow-controlling elements in the same or/and different assemblies may be manufactured from different materials. The frame, holders or/and supports may be manufactured from the materials different from those for the elements as well as from one another.

The major features of the aerodynamic skirts according to the present invention described above with references to FIGS. 1-9 may be summarized as follows.

The skirt assembly may consist of any number of airflow-controlling elements of the same or/and different configuration, size and/or orientation such as vertical, horizontal, or tilted at any angle with respect to the horizontal and/or vertical planes. A surface of the skirt assembly may be oriented any way such as longitudinally, laterally or tilted at any angle with respect to the horizontal and/or vertical planes. The elements in the assembly may re-direct airflow in any directions and different elements may re-direct airflow in the same or/and different directions.

Any pair of adjacent elements in a device may be attached to one another, positioned in a contact with one another, overlap one another or/and be separated by any distance, and different pairs may be separated by different distances. To enhance performance of the aerodynamic skirts, it is preferable to use an assembly of airflow controlling elements with an aerodynamically smooth surface rather than of rough-textured, interwoven, intertwined or otherwise configured elements that could potentially increase own air drag of the skirt. Unraveled, untwined, untangled and otherwise unwoven airflow-controlling elements are less likely to impact negatively aerodynamics of the assembly and an overall performance of the system.

The airflow-controlling elements may obstruct any part of the skirt area and preferably from 20% to 85% of the area. Openings in the skirt area include all parts of the area that are not tangibly obstructed by the elements such as separations between adjacent airflow-controlling elements, reduced size of selected elements and/or gaps inside surfaces of predetermined airflow-controlling elements. Cumulative area of the openings may occupy any part of the skirt area and preferably from 15% to 80% of the area.

A height of aerodynamic skirts may be small enough to ensure high ground clearance, preferably from 30% to 60% of the height of the lower edge of the vehicle body above the land surface.

The assembly may include any number of vortex generators separate from the airflow-controlling elements for producing small-scale vortices with the optimum intensity, size and lifespan; the generators may be of any type and configuration and positioned anywhere in the assembly, for example on the elements, ahead, behind or/and between the elements, and the like.

The skirt assembly may have a frame of any type such as continuous, from separated segments and the like, of any shape such as rectangular, triangular and the like, and of a fixed or an adjustable configuration. An adjustable frames may have a variable size and/or position such as being movable back-forth and/or up-down and/or foldable inside or/and outside the underbody volume.

Airflow-controlling elements in the skirt assemblies may be of any type such as air deflectors, panels, blades, fins and the like and of any shape such as rectangular, triangular, circular and the like. The elements may be flat, curved in any direction and/or at any angles and/or have any aerodynamically efficient cross-section; the curvature, angle or/and cross-section may be constant or vary along a height or/and a width of the element.

Any number of airflow-controlling elements in the skirt assemblies may be configured to generate small-scale vortices with the optimum intensity, size and lifespan by properly shaped surface edges or/and properly shaped gaps in the surfaces of the elements, and the like.

Any number of airflow-controlling elements in the skirt assemblies may be mounted immovably with respect to the vehicle body and/or have an adjustable configuration. An adjustable elements may move back-forth and/or up-down and/or be folded inside or/and outside the underbody volume.

The invention claimed is:

1. In combination with a land vehicle having a body disposed above wheel assemblies and being configured to move relative to a surrounding air in a generally horizontal plane parallel to a surface of the land and being subject to an air drag, side forces and side moments due to a relative velocity between the vehicle and the air, a system to be mounted underneath the vehicle body and configured to reduce the air drag, the side forces and the side moments as the land vehicle moves relative to the surrounding air, the system comprising:

at least one aerodynamic skirt disposed under said body of the vehicle, said skirt comprising:

an assembly of airflow-controlling elements arranged to form a surface of said skirt, said airflow-controlling elements obstructing a part of an area of said surface;

said assembly having unobstructed openings occupying a part of said area which is not obstructed by said airflow-controlling elements; and said assembly being disposed and configured to control adaptively an injection of the surrounding air under the body of the vehicle in accordance with the relative velocity between the vehicle and the air and to reduce the air drag, the side forces and the side moments acting on the vehicle;

wherein at least one of said airflow-controlling elements having unobstructed gaps in its surface; and said unobstructed gaps being disposed and configured to inject small-scale vortices and air jets under the body of the vehicle and intensify small-scale turbulent mixing under the body to reduce further the air drag, the side forces and the side moments acting on the vehicle.

2. The system according to claim 1, wherein said at least one aerodynamic skirt is one of a plurality of aerodynamic skirts strategically disposed underneath the vehicle body and configured to reduce the air drag, the side forces and the side moments as the vehicle moves relative to the surrounding air.

3. The system according to claim 1, wherein said assembly is formed from at least one airflow-controlling element.

4. The system according to claim 3, wherein said at least one airflow-controlling element is one of a plurality of airflow-controlling elements strategically disposed to form said assembly.

5. The system according to claim 1, wherein said assembly includes at least one vortex generator separate from said airflow-controlling elements and disposed to impose vorticity component on the surrounding air.

6. The system according to claim 5, wherein said at least one vortex generator is one of a plurality of vortex generators disposed strategically to impose vorticity component on the surrounding air.

7. The system according to claim 1, wherein said assembly being disposed and configured to produce backward air streams with negative air drag under said body of the vehicle in accordance with the relative velocity between the vehicle and the surrounding air and reduce the air drag of the vehicle.

8. The system according to claim 1, wherein said assembly being disposed and configured to control adaptively an injection of the surrounding air under the body of the vehicle over a larger area than said area of said surface of the skirt in accordance with the relative velocity between the vehicle and the air and reduce the air drag, the side forces and the side moments acting on the vehicle.

9. The system according to claim 1, wherein said assembly being disposed and configured to reduce detrimental impacts of a side wind on said land vehicle, the side wind is defined as airflow around a vehicle at non-zero yaw angle.

10. The system according to claim 1, wherein said airflow-controlling elements are disposed and configured to reduce own aerodynamic drag of said skirt and side forces acting on the skirt.

11. The system according to claim 1, wherein at least one of said airflow-controlling elements is adjustably mounted for adjusting a position and configuration relative to said body of the vehicle.

12. The system according to claim 11, wherein said at least one airflow-controlling element is one of a plurality of airflow-controlling elements adjustably mounted for adjusting positions and configurations relative to said body of the vehicle.

13. A method for reducing aerodynamic drag, side forces and side moments for a land vehicle having a body disposed above wheel assemblies and being configured to move relative to a surrounding air in a generally horizontal plane parallel to a surface of the land and being subject to said air drag, side forces and side moments due to a relative velocity between the vehicle and the air as the land vehicle moves relative to the surrounding air, said method comprising steps of:

creating at least one adaptive aerodynamic barrier between a volume under said body of the vehicle and the surrounding air;

providing at least one aerodynamic skirt disposed under said body of the vehicle to create said at least one adaptive aerodynamic barrier;

providing said aerodynamic skirt comprising an assembly of airflow-controlling elements arranged to form a surface of said skirt, said airflow-controlling elements obstructing a part of an area of said surface;

providing openings in said surface of the assembly occupying a part of said area of said surface which is not obstructed by said elements;

disposing and configuring said assembly to create said aerodynamic barrier to control adaptively an injection of the surrounding air under the body of the vehicle in accordance with the relative velocity between the vehicle and the air for reducing the air drag, the side forces and the side moments acting on the vehicle;

intensifying small-scale turbulent mixing under said body of the vehicle to reduce further the air drag, the side forces and the side moments acting on the vehicle;

injecting small-scale vortices and air jets under said body of the vehicle to intensify said small-scale turbulent mixing; and disposing and configuring unobstructed gaps in a surface of at least one of said airflow-controlling elements to inject said small-scale vortices and air jets under the body of the vehicle.

14. The method of claim 13, wherein said at least one adaptive aerodynamic barrier is one of a plurality of aerodynamic barriers created under said body of the vehicle.

15. The method of claim 13 further providing at least one vortex generator separate from said airflow-controlling elements for enhancing an efficiency of said aerodynamic barrier, said vortex generator being disposed within said assembly to impose vorticity component on the surrounding air.

16. The method of claim 15, wherein said at least one vortex generator is one of a plurality of vortex generators separate from said airflow-controlling elements and disposed strategically within said assembly to impose vorticity component on the surrounding air.

17. The method of claim 13, wherein said assembly being disposed and configured to reduce further the air drag of the vehicle by producing backward air streams with negative air drag under said body of the vehicle.

18. The method of claim 13, wherein said assembly being disposed and configured to reduce the air drag, the side forces and the side moments acting on the vehicle by controlling adaptively an injection of the surrounding air under the body of the vehicle over a larger area than said area of the skirt.

19. The method of claim 13, wherein said assembly being disposed and configured to reduce detrimental impacts of a side wind on said vehicle, the side wind is defined as airflow around a vehicle at non-zero yaw angle.

20. The method of claim 13, wherein said airflow-controlling elements are disposed and configured to reduce own aerodynamic drag of said skirt and side forces and side moments acting on the skirt.

\* \* \* \* \*